United States Patent [19]

Kawamura

[11] Patent Number: 4,976,228
[45] Date of Patent: Dec. 11, 1990

[54] VALVE CONTROL SYSTEM FOR INTERNAL COMBUSTION ENGINE

[75] Inventor: Hideo Kawamura, Samukawa, Japan

[73] Assignee: Isuzu Motors Limited, Tokyo, Japan

[21] Appl. No.: 420,953

[22] Filed: Oct. 13, 1989

[30] Foreign Application Priority Data

Oct. 31, 1988 [JP] Japan ................................. 63-275308

[51] Int. Cl.$^5$ .......................... F02B 77/00; F01L 9/04
[52] U.S. Cl. ............................... 123/90.11; 123/198 F
[58] Field of Search ................. 123/90.11, 198 F, 339, 123/322, 347, 348

[56] References Cited

U.S. PATENT DOCUMENTS

| | | | |
|---|---|---|---|
| 3,682,152 | 8/1972 | Muller-Berner | 123/90.11 |
| 4,227,505 | 10/1980 | Larson et al. | 123/198 F |
| 4,249,489 | 2/1981 | Bruder et al. | 123/198 F |
| 4,305,355 | 12/1981 | Jordan | 123/90.11 |
| 4,359,022 | 11/1982 | Nakamura et al. | 123/188 AA |
| 4,423,709 | 1/1984 | Arrieta | 123/90.11 |
| 4,522,179 | 6/1985 | Nishimura et al. | 123/198 F |
| 4,544,986 | 10/1985 | Büchl | 123/90.11 |
| 4,614,170 | 9/1986 | Pischinger et al. | 123/90.11 |
| 4,708,108 | 11/1987 | Sakamoto et al. | 123/198 F |

FOREIGN PATENT DOCUMENTS

| | | |
|---|---|---|
| 2737613 | 3/1978 | Fed. Rep. of Germany . |
| 8701505 | 9/1987 | Fed. Rep. of Germany . |
| 2307958 | 4/1975 | France . |
| 2502248 | 3/1982 | France . |
| 2601413 | 3/1987 | France . |

OTHER PUBLICATIONS

Toshio Okabayashi, Electronically Controlled Engine, 1/22/85, Patent Abstracts of Japan, vol. 9, No. 14, (M—352) [1737] and JP-A-59 162 312 (Mikuni Kogyo), 9/13/84.

Akiteru Fujiki, Fuel Feed Device of Internal-Combustion Engine, 10/6/84, Patent Abstracts of Japan, vol. 8, No. 220 (M—330) [1657] and JP-A-59 103 934 (Sanwa Seiki), 6/15/84.

Primary Examiner—Charles J. Myhre
Assistant Examiner—Weilan Lo
Attorney, Agent, or Firm—Staas & Halsey

[57] ABSTRACT

A control system for controlling intake and exhaust valves of an internal combustion engine includes electromagnetic actuator means for opening and closing the intake and exhaust valves. When the engine is idling, drive signals applied to the electromagnetic actuator means for selected cylinders are cut off, so that only the other cylinders are enabled.

4 Claims, 3 Drawing Sheets

4,976,228

VALVE CONTROL SYSTEM FOR INTERNAL COMBUSTION ENGINE

BACKGROUND OF THE INVENTION

The present invention relates to a valve control system for electromagnetically actuating intake and exhaust valves of an internal combustion engine.

While an internal combustion engine is idling, it only requires minimum rotative power enough to keep the engine running, and it is not necessary to burn fuel in all cylinders of the engine. In order to operate the engine with only certain cylinders enabled, the intake and exhaust valves of those cylinders which are disabled should be stopped in operation to eliminate the pumping loss of the disabled cylinders.

Intake and exhaust valves of an internal combustion engine are generally opened and closed by a valve operating mechanism according to a cam profile of a camshaft which rotates in synchronism with the crankshaft of the engine. Various arrangements for stopping the operation of some intake and exhaust valves have been proposed. According to one design, the operation of an intake or exhaust valve is stopped by moving the fulcrum of a rocker arm which transmits the motion of a cam to the valve. According to another scheme, the operation of an intake or exhaust valve is stopped by releasing hydraulic pressure from a hydraulic tappet.

However, the proposed valve disabling devices are structurally complex, and are not satisfactorily reliable when the valve is to be disabled while the engine is in operation.

SUMMARY OF THE INVENTION

It is an object of the present invention to provide a control system for controlling the intake and exhaust valves of an internal combustion engine, the control system including an electromagnetic actuator means for electromagnetically actuating the intake and exhaust valves, the arrangement being such that some cylinders of the engine can be disabled simply by cutting off drive signals supplied to the electromagnetic actuator means while the engine is idling, without employing a complex valve operating mechanism.

Another object of the present invention is to provide a control system for controlling the intake and exhaust valves of an internal combustion engine, which control system being arranged to prevent lubricating oil from remaining the cylinders by successively disabling the cylinders each time the engine makes a predetermined number of rotations.

According to the present invention, there is provided a control system for controlling intake and exhaust valves of an internal combustion engine, comprising electromagnetic actuator means for opening and closing the intake and exhaust valves, control means for applying drive signals to the electromagnetic actuator means, an engine speed sensor for detecting the rotational speed of the internal combustion engine, an accelerator pedal movement sensor for detecting the amount of depression of an accelerator pedal which controls a load on the internal combustion engine, and cylinder control means for determining that the internal combustion engine is idling and cutting off drive signals to the electromagnetic actuator means for selected cylinders of the internal combustion engine, when the engine speed based on a detected signal from the engine speed sensor is lower than a preset speed and the amount of depression of the accelerator pedal based on a detected signal from the accelerator pedal movement sensor is smaller than a preset amount.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
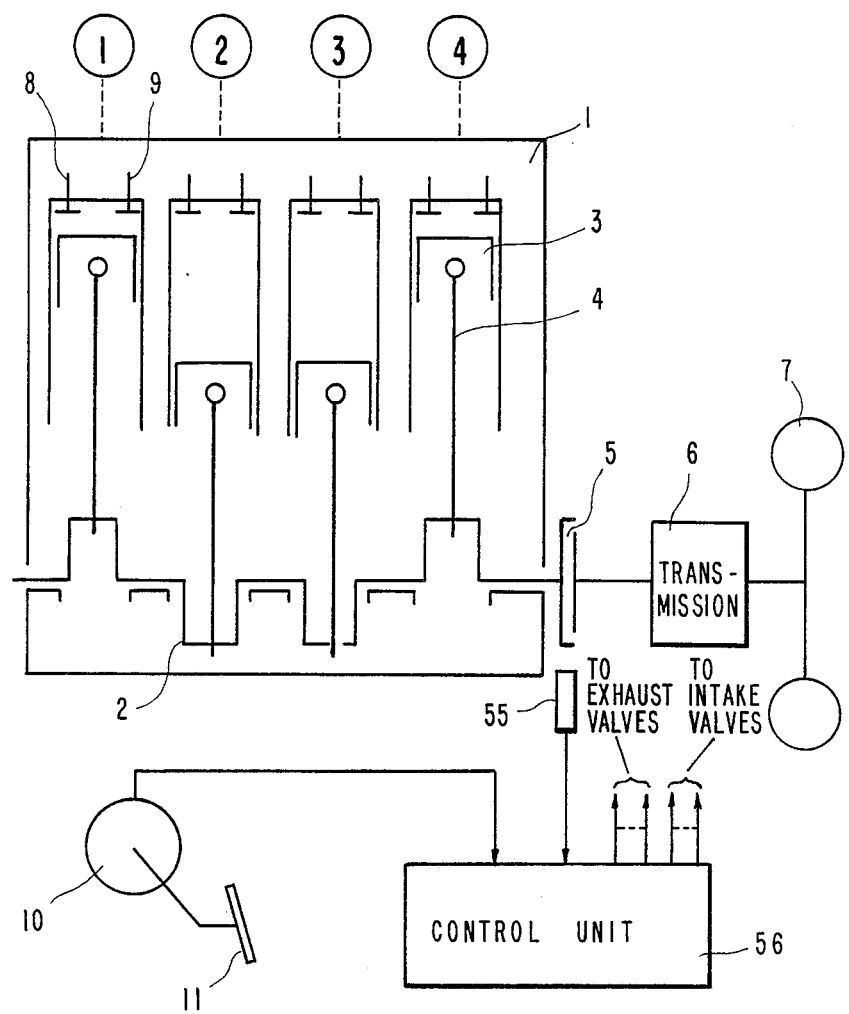
FIG. 1 is a schematic view, partly in block form, of a valve control system for an internal combustion engine according to the present invention.
Figure 2:
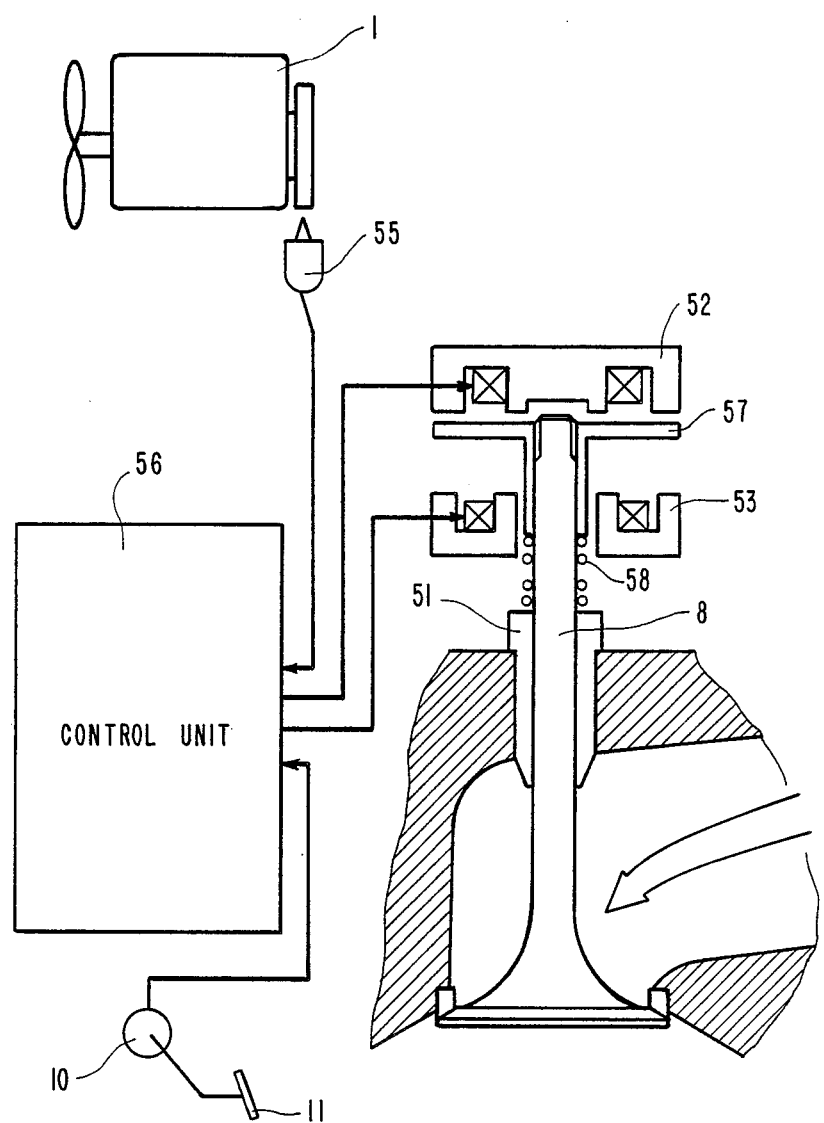
FIG. 2 is a cross-sectional view of a valve actuator means.

FIGS. 1 and 2 show a valve control system for an internal combustion engine according to the present invention.

As shown in FIG. 1, an internal combustion engine 1, which is shown as a four-cylinder engine in this embodiment, has an intake valve 8 and an exhaust valve 9 in each of the cylinders. Expansive forces produced by burning fuel in each of the cylinders are transmitted from a piston 3 through a connecting rod 4 to a crankshaft 2 to rotate the crankshaft 2 about its own axis. The rotative power transmitted to the crankshaft 2 is transmitted through power transmitting mechanisms such as a clutch 5, a transmission 6, etc. to road wheels 7 to propel a motor vehicle on which the engine 1 is mounted. The amount by which an accelerator pedal 11 is depressed by an accelerator pedal movement sensor 10, and the rotational speed of the engine 1 is detected by an engine speed sensor 55. Detected signals from these sensors are supplied to a control unit 56. The control unit 56 produces a drive signal based o the detected signals from the sensors 11, 55, and applies the produced drive signal to valve actuator means for actuating the intake and exhaust valves 8, 9. The valve actuator means for actuating the intake valve 8 will be described below with reference to FIG. 2.

The intake valve 8 is made of a ceramic material such as silicon nitride or silicon carbide, and is slidably fitted in a valve guide 51 mounted in a cylinder head and made of a ceramic material such as silicon nitride or silicon carbide. A movable member 57 of a magnetic material is fixedly fitted over the upper end of the stem of the intake valve 8. An upper electromagnet 52 and a lower electromagnet 53 are disposed above and below, respectively, the movable member 57 in spaced-apart relation thereto. Between the valve guide 51 and the movable member 57, there is disposed a coil spring 58 for normally urging the intake valve 8 to close the intake port so that the intake valve 8 is prevented from being unseated when the upper and lower electromagnets 52, 53 are de-energized.

When the valve 8 is closed, the coil of the upper electromagnet 52 is continuously energized to attract the movable member 57 upwardly, thereby keeping the valve 8 closed. To open the valve 8, the coil of the upper electromagnet 52 is de-energized to release the movable member 57 off the upward attractive force, and the coil of the lower electromagnet 53 is simultaneously energized to produce a downward attractive force. The movable member 57 is therefore attracted to the lower electromagnet 53 to move the valve 8 downwardly, thus opening the intake port. In order to close the valve from the open condition, the coil of the lower electromagnet 53 is de-energized to free the movable member 57 from the downward attractive force and the coil of the upper electromagnet 52 is energized to attract the movable member 57 upwardly.

The valve control system of the present invention will be described below.

The control unit 56 determines, from the detected signals from the engine speed sensor 55 and the accelerator pedal movement sensor 10, that the engine is idling, and controls the engine cylinders, when the engine speed is lower than a predetermined speed and the amount of depression of the accelerator pedal 11 is smaller than a predetermined amount. Normally, the four-cycle four-cylinder engine burns fuel successively in the first, second, third, and fourth cylinders, in the order named, each time the crankshaft 2 makes half of one rotation. The valve control system of the present invention first enables the first and fourth cylinders only, and then enables the second and third cylinders only after the crankshaft 2 has made a certain number of rotations. As long as the engine is idling, the valve control system operates the engine cyclically between a mode in which only the first and fourth cylinders are enabled and a mode in which only the second and third cylinders are enabled. The cylinders are successively enabled in this manner in order to prevent lubricating oil from remaining in those cylinders which are disabled and also to uniformize wear of the cylinders. An engine cylinder is disabled by stopping the operation of the intake and exhaust valves of the cylinder and cutting off fuel supply to the cylinder.

Figure 3:
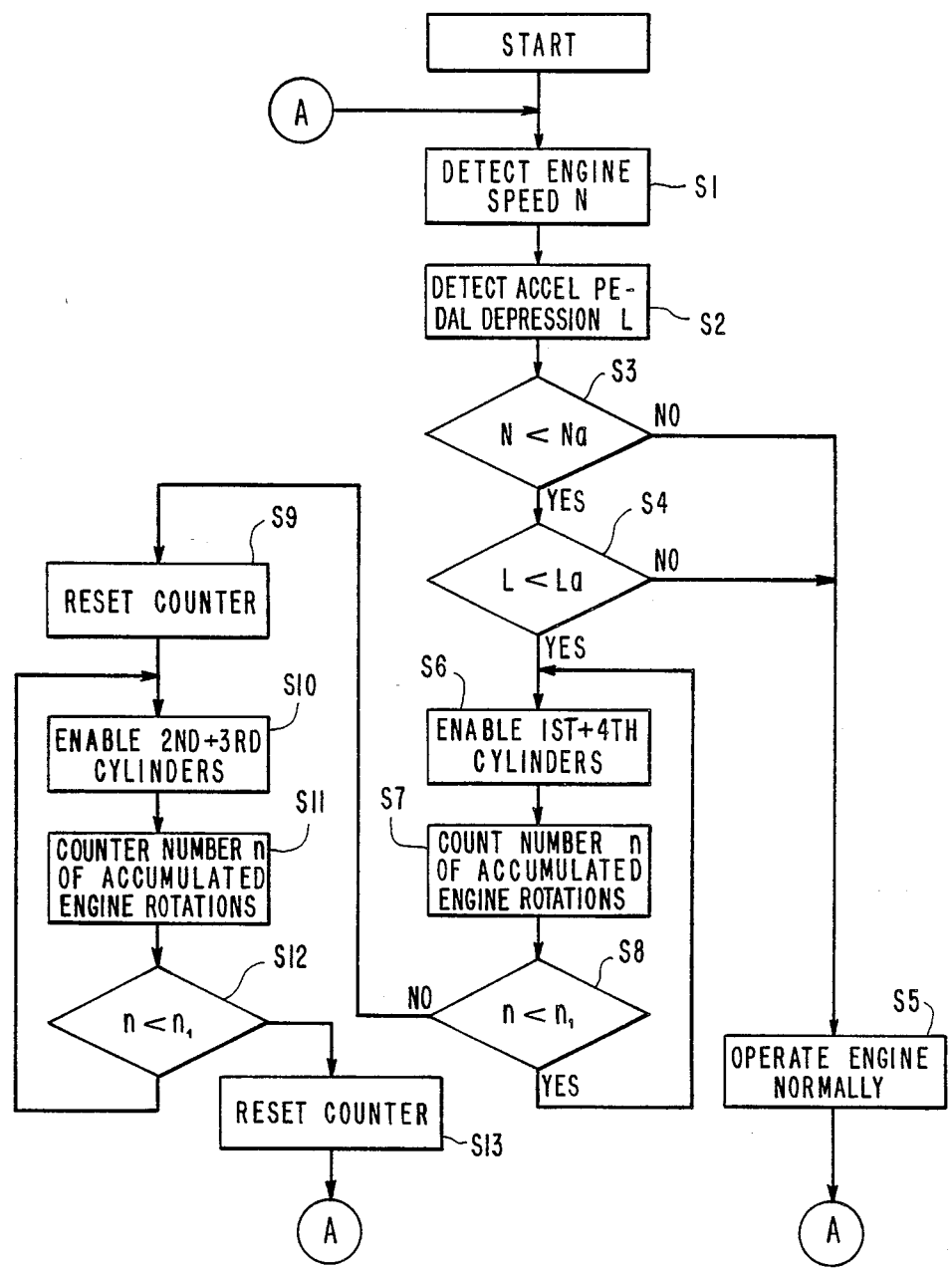
FIG. 3 is a flowchart of a control sequence of the control system.

A control sequence executed by the control unit 56 will be described below with reference to FIG. 3.

The control unit 56 reads an engine speed N detected by the engine speed sensor 55 in a step 1, and reads an amount of depression L of the accelerator pedal 11 detected by the accelerator pedal movement sensor 10 in a step 2. Then, the control unit 56 compares the engine speed N and a preset speed Na in a step 3. If the engine speed N is lower than the preset speed Na, then the control unit 56 compares the amount of depression L with a preset amount of depression La in a step 4. If the amount of depression L is smaller than the preset amount of depression La, then the control unit 56 determines that the engine is idling, and control goes to a step 6 for cylinder control. If the engine speed N is higher than the preset speed Na in the step 3 or if the amount of depression L of the accelerator pedal 11 is smaller than the preset amount of depression La in the step 4, then the control system 56 determines that the engine is not idling, and control goes to a step 5 in which the engine is operated normally.

In the step 6, only the first and fourth cylinders of the engine are enabled by cutting off drive signals applied to the lower electromagnets 53 of the valve actuator means for the second and third cylinders. The number n of accumulated rotations of the engine is counted in a step 7, which is followed by a step 8 which determines whether the number n of accumulated engine rotations has reached a preset count nl or not. If the number n of accumulated engine rotations is smaller than the preset count nl, then the first and fourth cylinders remain enabled until the number n of accumulated engine rotations reaches the preset count nl. When the number n of accumulated engine rotations has reached the preset count nl, control proceeds to a step 9 in which the counter for counting the number of accumulated engine rotations is reset. Then, control goes to a step 10 in which only the second and third cylinders are enabled in a step 10. More specifically, the drive signals applied to the lower electromagnets 53 of the valve actuator means for the first and fourth cylinders are cut off, and drive signals are applied to the upper and lower electromagnets 52, 53 of the valve actuator means for the second and third cylinders. The second and third cylinders remain enabled until the number n of accumulated engine rotations reaches the preset count nl (see steps 10 and 11). After the number n of accumulated engine rotations has reached the preset count nl (see a step 12), the counter is reset in a step 13, and the process from the step 1 is repeated.

With the present invention, as described above, when the engine is idling, drive signals applied to the electromagnetic actuator means for electromagnetically actuating the intake and exhaust valves of the engine are cut off. In this manner, selected cylinders of the engine can easily be disabled without employing a complex valve operating mechanism which has heretofore been used in connection with engines. As long as the engine is idling, the engine is operated cyclically between the mode in which only the first and second cylinders are enabled and the mode in which only the third and fourth cylinders are enabled. Therefore, lubricating oil is prevented from remaining in the disabled cylinder, and wear of the cylinders is uniformized. Moreover, since the intake and exhaust valves are made of a ceramic material, they are lighter than metallic valves, and are subjected to smaller forces of inertia during operation. Accordingly, the intake and exhaust valves operate smoothly, and the forces required by the electromagnetic actuator means to actuate the valves may be reduced.

Although a certain preferred embodiment has been shown and described, it should be understood that many changes and modifications may be made therein without departing from the scope of the appended claims.

What is claimed is:

1. A control system for controlling intake and exhaust valves of an internal combustion engine, comprising:
    electromagnetic actuator means for opening and closing the intake and exhaust valves;
    control means for applying drive signals to said electromagnetic actuator means;
    an engine speed sensor for detecting rotational speed of the internal combustion engine;
    an accelerator pedal movement sensor for detecting the amount of depression of an accelerator pedal which controls a load on the internal combustion engine;
    cylinder control means for determining that the internal combustion engine is idling and cutting off drive signals to the electromagnetic actuator means for selected cylinders of the internal combustion engine when the engine speed based on a detected signal from said engine speed sensor is lower than a preset speed and the amount of depression of the accelerator pedal based on a detected signal from said accelerator pedal movement sensor is smaller than a present amount; and modifying means for modifying the cylinders for which the drive signals are cut off by said cylinder control means, depending on a rotational speed of the internal combustion engine.

2. A control system for controlling intake and exhaust valves of an internal combustion engine, comprising:

electromagnetic actuator means for opening and closing the intake and exhaust valves;

control means for applying drive signals to said electromagnetic actuator means;

an engine speed sensor for detecting the rotational speed of the internal combustion engine;

an accelerator pedal movement sensor for detecting the amount of depression of an accelerator pedal which controls a load on the internal combustion engine;

cylinder control means for determining that the internal combustion engine is idling and cutting off drive signals to the electromagnetic actuator means for selected cylinders of the internal combustion engine, when the engine speed based on a detected signal from said engine speed sensor is lower than a preset speed and the amount of depression of the accelerator pedal based on a detected signal from said accelerator pedal movement sensor is smaller than a preset amount; and wherein said cylinder control means comprises means for cutting off drive signals tot he electromagnetic actuator means for different selected cylinders each time the internal combustion engine has reached a preset number of rotations.

3. A control system according to claim 1, wherein the intake and exhaust valves are made of a ceramic material.

4. A control system according to claim 1, wherein said electromagnetic actuator means for each of the intake and exhaust valves comprises a movable member of a magnetic material mounted on an upper end of the stem of the valve, and upper and lower electromagnetics disposed above and below said movable member in spaced-apart relation.

* * * * *